(12) United States Patent
Stephenson et al.

(10) Patent No.: US 7,532,260 B2
(45) Date of Patent: May 12, 2009

(54) CHOLESTERIC LIQUID CRYSTAL DISPLAY SYSTEM

(75) Inventors: Stanley W. Stephenson, Spencerport, NY (US); Xiang-Dong Mi, Rochester, NY (US); David M. Johnson, Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 318 days.

(21) Appl. No.: 11/028,846

(22) Filed: Jan. 4, 2005

(65) Prior Publication Data

US 2005/0151887 A1    Jul. 14, 2005

Related U.S. Application Data

(62) Division of application No. 10/256,930, filed on Sep. 27, 2002, now Pat. No. 6,885,409.

(51) Int. Cl.
*G02F 1/13* (2006.01)

(52) U.S. Cl. ............................. 349/2; 349/10; 349/29; 349/86; 349/110; 349/188

(58) Field of Classification Search ................. 349/2, 349/35, 86, 88, 169, 110, 29, 61, 65, 10, 349/20, 22, 24, 25, 167, 175, 187, 182, 183, 349/185, 188

See application file for complete search history.

(56) References Cited

U.S. PATENT DOCUMENTS 3,401,262 A    9/1968    Fergason et al.

(Continued)

FOREIGN PATENT DOCUMENTS

JP    11-258759    9/1999

(Continued)

OTHER PUBLICATIONS

Yamamoto, S., et al., *23.3: A Novel Photoaddressable Electronic Paper Utilizing Cholesteric LC Microcapsules and Organic Photoconductor*, SID 01 Digest, 2001, pp. 362-365.

(Continued)

*Primary Examiner*—Thoi V Duong
(74) *Attorney, Agent, or Firm*—Alston & Bird LLP

(57) ABSTRACT

A display system includes a display arranged to receive an image wise pattern of light to form an image, including, a pair of conductors, at least one conductor being transparent, a layer of cholesteric liquid crystal material disposed between the conductors, the liquid crystal material having multiple stable optical states at zero electrical field, and a light absorber for forming an image wise thermal pattern in the liquid crystal sufficient to change the optical state of the cholesteric liquid crystal in response to an image wise pattern of light; a display writer, including, a light source for producing a flash of light of sufficient intensity to generate sufficient heat in the light absorber to change the optical state of the cholesteric liquid crystal, a mask located between the light source and the display for defining the image wise pattern of light, a display drive connectable to the conductors for generating an electric field between the conductors for changing the optical state of the cholesteric liquid crystal, and a controller connected to the light source and the display drive for controlling the intensity of the electrical field and actuating the light source to create an image on the display.

9 Claims, 9 Drawing Sheets

U.S. PATENT DOCUMENTS

| | | |
|---|---|---|
| 3,578,844 A | 5/1971 | Churchill et al. |
| 3,789,225 A | 1/1974 | Leder |
| 4,649,517 A | 3/1987 | Kitazima et al. |
| 4,752,820 A | 6/1988 | Kuroiwa et al. |
| 5,124,183 A * | 6/1992 | Nakano et al. ............ 430/20 |
| 5,437,811 A * | 8/1995 | Doane et al. ........ 252/299.01 |
| 5,695,682 A | 12/1997 | Doane et al. |
| 5,920,364 A | 7/1999 | Akins et al. |
| 6,201,587 B1 | 3/2001 | Sakamaki |
| 6,204,899 B1 | 3/2001 | Hall |
| 6,285,422 B1 | 9/2001 | Maeda et al. |
| 6,423,368 B1 | 7/2002 | Stephenson et al. |
| 6,639,637 B2 | 10/2003 | Stephenson |
| 6,677,936 B2 * | 1/2004 | Jacobsen et al. ........... 345/211 |
| 6,690,447 B1 | 2/2004 | Stephenson et al. |
| 6,774,880 B2 | 8/2004 | Kobayashi |
| 6,778,227 B2 | 8/2004 | Sakamaki |
| 7,019,722 B2 | 3/2006 | Kobayashi et al. |
| 7,046,311 B2 * | 5/2006 | Kobayashi et al. ............. 349/2 |

FOREIGN PATENT DOCUMENTS

| | | |
|---|---|---|
| JP | 200275629 A | 10/2000 |

OTHER PUBLICATIONS

Yoshida et al., *Reflective Display with Photoconductive Layer and a Bistable, Reflective Cholesteric Mixture*, SID 96, Applications Digest, 1996, p. 59-62.

* cited by examiner

CHOLESTERIC LIQUID CRYSTAL DISPLAY SYSTEM

CROSS-REFERENCE TO RELATED APPLICATIONS

This is a divisional application of U.S. patent application Ser. No. 10/256,930 filed Sep. 27, 2002, now U.S. Pat. No. 6,885,409 corresponding to U.S. Application Publication No. US 2004/0061808A1.

FIELD OF THE INVENTION

The present invention relates to a display system having a polymer dispersed cholesteric liquid crystal that change optical states in response to heat, light and electrical field.

BACKGROUND OF THE INVENTION

Cholesteric liquid crystals have the property of maintaining several different optical states in the absence of electrical field. Additionally, cholesteric liquid crystals can change optical states in response to applied electrical and/or thermal fields. Those properties make them useful in the development of field-stable, re-writable displays.

U.S. Pat. No. 3,401,262 issued Sep. 10, 1968 to Fergason et al. discloses a cathode ray tube to apply light to a screen. The screen has a photoconductive layer that is excited by an electrical field applied by fine leads across the photoconductive layer. The screen has a layer of a temperature sensitive cholesteric material that changes reflective wavelength with slight changes in temperature, and changes hue in heated areas. Light from the cathode ray tube strikes the photoconductor layer, creating heat which can be used to selectively change the color of the sheet of cholesteric material. The system uses a complex cathode ray tube and a photoconductor layer and ceases to present an image in the absence of an electrical field.

U.S. Pat. No. 3,578,844 issued May 18, 1971 to Churchill discloses a sheet of gelatin encapsulated cholesteric material without a photosensitive layer. The sheet is put into a first reflective state by heating. Portions of the sheet are written into a black (clear) state by the application of DC fields. The sheet is heated to reset the display. The encapsulated material in the sheet retained written information without fade at ambient conditions for eight weeks.

U.S. Pat. No. 3,789,225 issued Jan. 29, 1974 to Leder discloses a glassy cholesteric liquid crystal between glass plates. Glassy liquid crystal materials are solidified liquid crystals in an orderly state at ambient temperatures. They are not responsive to electrical fields in the glassy state. The apparatus writes the sheet to an initial state by heating the material above the isotropic (liquid) transition point. As the material is cooled, a high-intensity xenon flash lamp is used to disturb the material so that flash disturbed areas solidify into a state different than areas not receiving flash energy. The imaging system requires that the materials be raised to a high temperature, and cooled at a fast rate in the presence of selective high-intensity flash light. No electrical fields are applied to the media.

Conventional, non-glassy liquid crystals have the property of being electrically driven between a planar state reflecting a specific visible wavelength of light and a light scattering focal-conic state at ambient temperatures. Chiral nematic liquid crystals, also known as cholesteric liquid crystals have the capacity of maintaining one of multiple given states in the absence of an electric field. U.S. Pat. No. 5,437,811 issued Aug. 1, 1995 to Doane et al. discloses a light-modulating cell having a polymer dispersed chiral nematic liquid crystal. The chiral nematic liquid crystal has the property of being driven between a planar state reflecting a specific visible wavelength of light and a weakly light scattering focal-conic state. Chiral nematic liquid crystals, also known as cholesteric liquid crystals, have the capacity of maintaining one of multiple given states in the absence of an electric field. The Doane et al. patent discloses the use of only electrical fields to change the optical state of cholesteric liquid crystals. The technology writes image data line sequentially. Sequentially writing data lines is slow compared to writing all pixels at once and requires electrical drivers on each column and row line.

Yamamoto et al. in A Novel Photoaddressable Electronic Paper Utilizing Cholesteric LC Microcapsules and Organic Photoconductor, SID 2001 DIGEST, pp. 362-365, create an electronic paper having a photoconductive layer and a polymer encapsulated cholesteric liquid crystal that is field responsive at ambient temperatures. A high electrical field is applied across both layers, and the photoconductive layer provides a bias voltage in the presence of light. The high and low field states across the material write cholesteric material into different optical states.

Prior art light sensitive sheets have required expensive and complex photosensitive layers for operation. Electrical drive systems must write data sequentially, requiring complex electronic drives. Glassy liquid crystals change state with the application of large amounts of heat and no electrical field. There is a need therefore for a light written sheet that could have image data written simultaneously without a photosensitive layer at low temperatures.

SUMMARY OF THE INVENTION

The need is met according to the present invention by providing a display system that includes a display arranged to receive an image wise pattern of light to form an image, including a pair of conductors, at least one conductor being transparent; a layer of cholesteric liquid crystal material disposed between the conductors, the cholesteric liquid crystal material having multiple stable optical states at zero electrical field; and a light absorber for forming an image wise thermal pattern in the liquid crystal sufficient to change the optical state of the cholesteric liquid crystal in response to an image wise pattern of light; a display writer, including, a light source for producing a flash of light of sufficient intensity to generate sufficient heat in the light absorber to change the optical state of the liquid crystal, a mask located between the light source and the display for defining the image wise pattern of light, a display drive connectable to the conductors for generating an electric field between the conductors for changing the optical state of the liquid crystal, and a controller connected to the light source and the display drive for controlling the intensity of the electrical field and actuating the light source to create an image on the display.

ADVANTAGES

The present invention has the advantage that it provides a simple sheet structure that can be written and re-written using a xenon flash lamp and an electrical field. A single writing process can be used to write the sheet without regard to prior written information. The writing process is fast, and improves image quality over sheets written only electrically.

DETAILED DESCRIPTION OF THE PREFERRED EMBODIMENT

Figure 1:
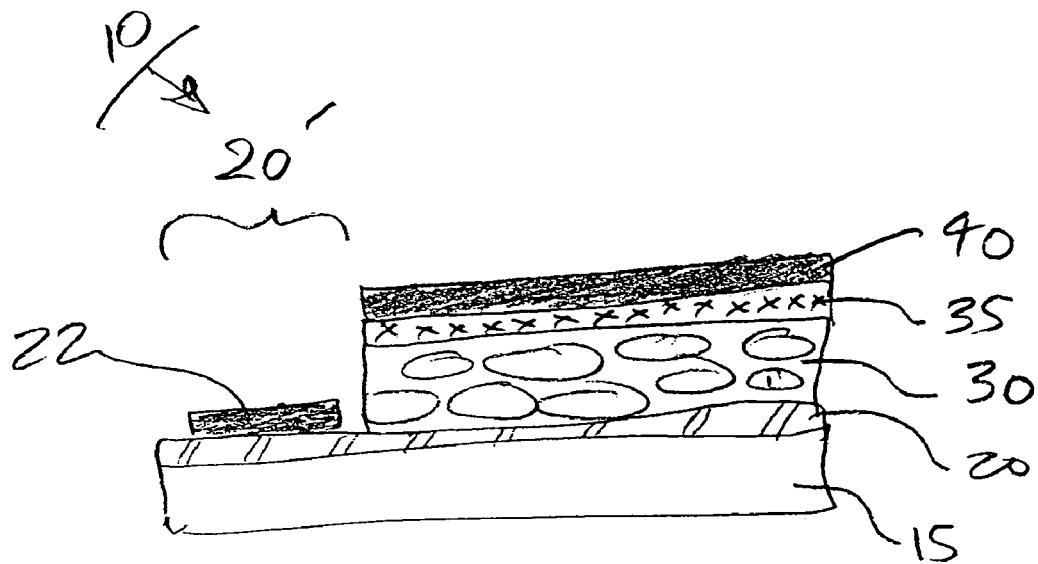
FIG. 1 is a partial cross sectional view of a display in accordance with the present invention.

Referring to FIG. 1, a display 10 according to the present invention includes a display substrate 15, such as a thin transparent polymeric material, for example, Kodak Estar film base formed of polyester plastic that has a thickness of between 20 and 200 (preferably 125 microns). Other polymers, such as transparent polycarbonate, can also be used.

A first transparent conductor 20 is formed on display substrate 15. First transparent conductor 20 can be tin-oxide, indium-tin-oxide (ITO), or polythiophene, with ITO being the preferred material. Typically the material of first transparent conductor 20 is sputtered or coated as a layer over display substrate 15 having a resistance of less than 1000 ohms per square.

In a preferred embodiment, a first conductor cover 22 is printed over first transparent conductor 20. First conductor cover 22 can be screen printed conductive ink such as Electrodag 423SS screen printable electrical conductive material from Acheson Corporation. Such screen printable conductive materials comprise finely divided graphite particles in a thermoplastic resin. First conductor cover 22 protects first transparent conductor 20 from abrasion.

Light modulating layer 30 overlays a first portion of first transparent conductor 20. A portion of light modulating layer 30 is removed to create exposed first conductor 20' to permit electrical contact. Light modulating layer 30 contains cholesteric liquid crystal material, such as those disclosed in U.S. Pat. No. 5,695,682 issued Dec. 9, 1997 to Doane et al., the disclosure of which is incorporated by reference. Application of electrical fields of various intensity and duration can be employed to drive a chiral nematic material (cholesteric) into a reflective state, to a substantially transparent state, or an intermediate state. These materials have the advantage of having first and second optical states that are both stable in the absence of an electrical field. The materials can maintain a given optical state indefinitely after the field is removed. Cholesteric liquid crystal materials can be Merck BL112, BL118 or BL126, available from E.M. Industries of Hawthorne, N.Y.

In a preferred embodiment, light modulating layer 30 is E.M. Industries' cholesteric material BL-118 dispersed in deionized photographic gelatin. The liquid crystal material is mixed at 8% concentration in a 5% gelatin aqueous solution. The liquid crystal material is dispersed to create an emulsion having 8-10 micron diameter domains of the liquid crystal in aqueous suspension. The domains can be formed using the limited coalescence technique described in U.S. Pat. No. 6,423,368 issued Jul. 23, 2002 to Stephenson et al. The emulsion is coated on a polyester display substrate over the first transparent conductor(s) and dried to provide an approximately 9-micron thick polymer dispersed cholesteric coating. Other organic binders such as polyvinyl alcohol (PVA) or polyethylene oxide (PEO) can be used in place of the gelatin. Such emulsions are machine coatable using coating equipment of the type employed in the manufacture of photographic films. A gel sub layer can be applied over the first transparent conductor 20 prior to applying light modulating layer 30 as disclosed copending U.S. Ser. No. 09/915,441 filed Jul. 26, 2001 by Stephenson et al.

Figure 2:
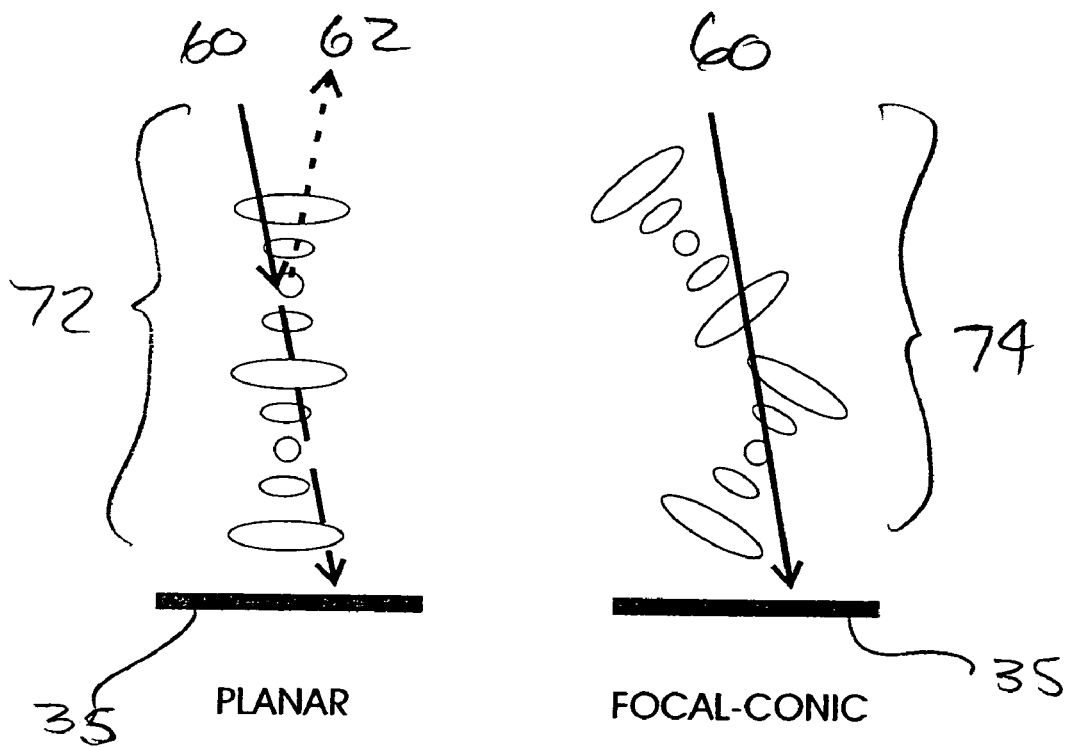
FIG. 2 is a schematic side view of a prior art chiral nematic material in a planar and focal-conic state responding to incident light.

FIG. 2 is a schematic side sectional view of a chiral nematic material in a planar and focal-conic state responding to incident light. In the figure on the left, after a high voltage field has been applied and quickly switched to zero potential, the liquid crystal molecules become planar liquid crystal 72, which reflect portions of incident light 60 as reflected light 62. In the figure on the right side of FIG. 2, upon application of a lower voltage field, the molecules of the chiral nematic material break into weakly forward scattering cells known as focal-conic liquid crystal 74. Increasing the time duration of a low-voltage pulse progressively drives the molecules that were originally reflective planar liquid crystal 72 towards a fully evolved and light scattering focal-conic liquid crystal 74.

A light absorber 35 is positioned on the side opposing the incident light 60. Light absorber 35 can be a thin layer of light absorbing, sub-micron carbon in a gel binder as disclosed copending U.S. Ser. No. 10/036,149 filed Dec. 26, 2001 by Stephenson. As fully evolved focal-conic liquid crystal 74, the cholesteric liquid crystal is forward light scattering and incident light 60 is absorbed by light absorber 35 to create a black image. Progressive evolution towards the focal-conic state causes a viewer to perceive reflected light 62 that transitions to black as the cholesteric material changes from reflective planar liquid crystal 72 to a fully evolved light scattering focal-conic liquid crystal 74. When the field is removed, light modulating layer 30 maintains a given optical state indefinitely. The states are more fully discussed in U.S. Pat. No. 5,437,811, referenced above.

Returning to FIG. 1, light absorber 35 is disposed between second conductor 40 and light modulating layer 30 to improve contrast. A second conductor 40 overlays light modulating layer 30. Second conductor 40 has sufficient conductivity to provide an electric field between the first transparent conductor 20 and second conductor 40 strong enough to change the optical state of the cholesteric material in light modulating layer 30. Second conductor 40 can be formed, for example, by the well known technique of vacuum deposition for forming a layer of conductive material such as aluminum, tin, silver, platinum, carbon, tungsten, molybdenum, tin or indium or combinations thereof. The layer of conductive material can be patterned using well known techniques of photolithography, laser etching or by application through a mask.

In a preferred embodiment, second conductor 40 is formed by screen printing a conductive ink such as Electrodag 423SS screen printable electrical conductive material from Acheson Corporation. Such screen printable conductive materials comprise finely divided graphite particles in a thermoplastic resin. Screen printing is preferred to minimize the cost of manufacturing the display.

The use of a flexible support for display substrate 15; first transparent conductor 20; machine coated light absorber 35 and light modulating layer 30; and printed second conductor 40 and first conductor cover 22 permits the fabrication of a low cost flexible display. Small displays according to the present invention can be used as electronically rewritable tags for inexpensive, limited rewrite applications.

Figure 3:
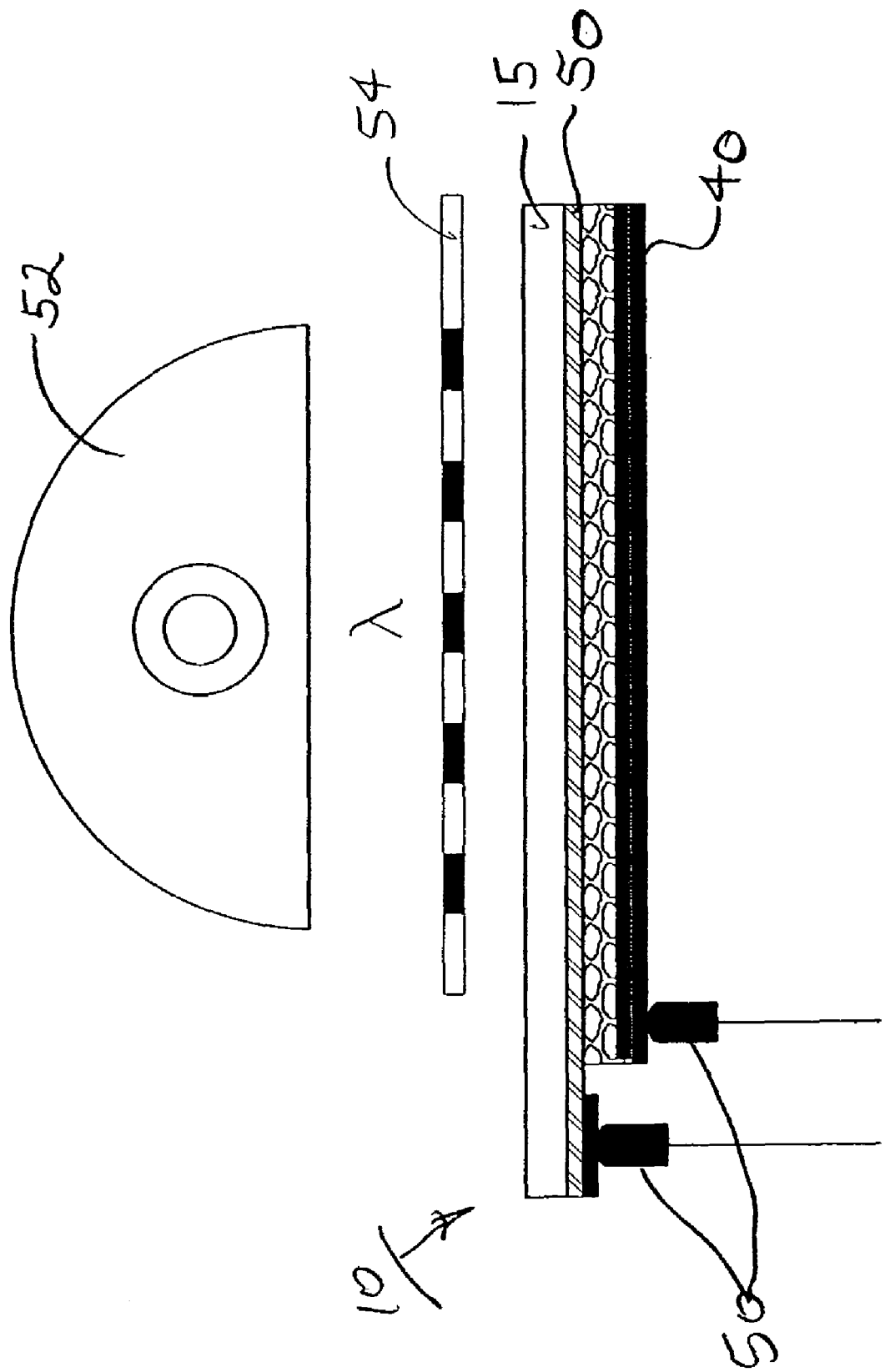
FIG. 3 is schematic side view of an experimental setup used to simulate a display system in accordance with the present invention.

Referring to FIG. 3, a display 10 in accordance with the preferred embodiment was positioned so that a conventional xenon flash 52 exposed portions of display 10 through mask 54. In the experiment, flash 52 was a Vivitar model 285HV professional flash lamp and mask 54 was a sheet of Dupont Mylar transparency with an electro-photographic printed image. The output of flash 52 could be adjusted to imprint an image on display 10 if the cholesteric material was initially either planar liquid crystal 72 or focal-conic liquid crystal 74.

A set of electrodes was applied to first conductor cover 22 and second conductor 40. An electrical field was applied across electrodes 50, and flash imprinted images on display 10 were erased. Display 10 could be imprinted and erased multiple times without damage to display 10. Display 10 was positioned so that the black second conductor 40 faced flash 52 and mask 54. Flash 52 could be adjusted so that images were imprinted through second conductor 40. Images made in the reversed manner could be electrically erased using a field across electrodes 50. From these experiments, it was concluded that the printing process occurs due to thermal energy being applied to second conductor 40 through either side of display 10. A heat pulse of correct power and duration provides a thermal flux effect that can write cholesteric material into either the planar or focal-conic state. These experiments are the first demonstration of the use of masked high-intensity light to thermally print and reprint images on polymer dispersed cholesteric liquid crystals. The method and materials permit multiple erasure and writing cycles. Furthermore, the structure of display 10 is flexible and low-cost.

Experiments were performed to determine the response of display 10 to the application of electrical fields during the thermal heat pulses from flash 52. In a first experiment, display 10 was electrically written into the planar state using a high voltage pulse. The output of flash 52 was set so initially planar liquid crystal was selectively written into the focal-conic state in unmasked areas. The display was repeatedly reset to the planar state, and written using a series of voltages.

Figure 4:
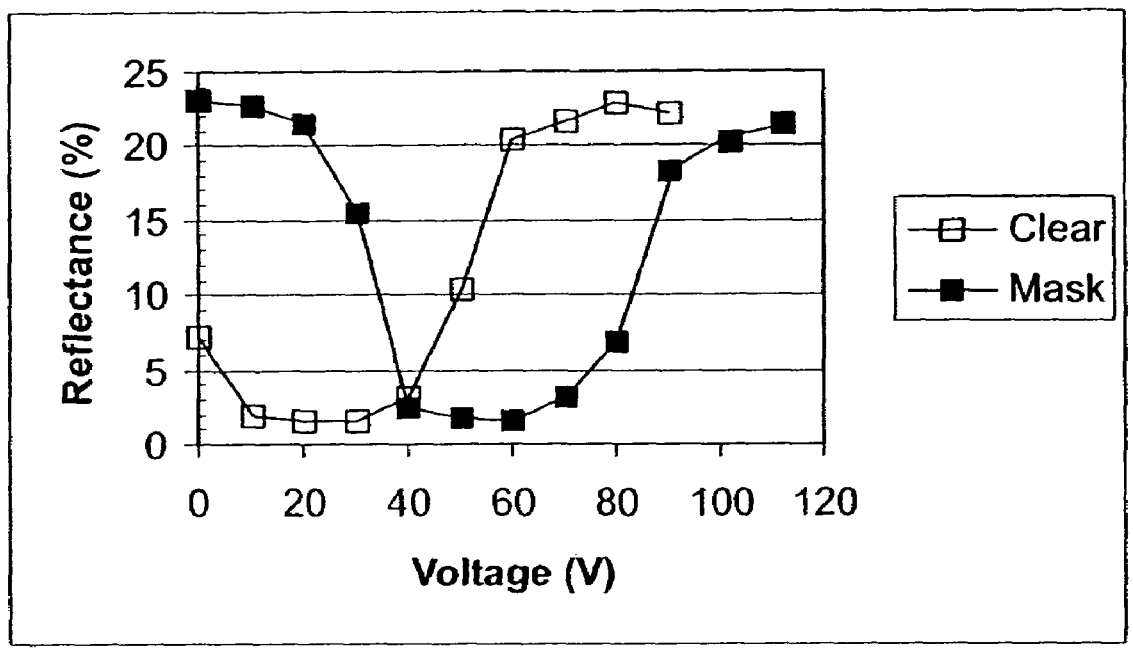
FIG. 4 is a plot of the response of the display of FIG. 1, originally in the planar state, at constant flash lamp energy and various voltages.

FIG. 4 shows a plot of the response of the display of FIG. 1, originally in the planar state, at constant flash lamp energy and various voltages. For each test, the material was initialized into the planar using a high voltage pulse. Then a test voltage was applied during a flash event. The resulting curve is equivalent to the response curve found in the Doane et al. patent for materials tested without flash. The curve for the masked material (filled boxes) is the same response of materials in the absence of the thermal pulse provided by flash 52. The clear curve is the same display in the presence of the heat pulse from the flash combined with an electrical field. At zero applied voltage and without a mask, planar material is written into the focal conic-state and has a reflectance of about 7 percent. Applying a low voltage, such as 10 volts, improves the clarity of focal-conic state from 7 percent to about 2 percent reflectance.

Figure 5:
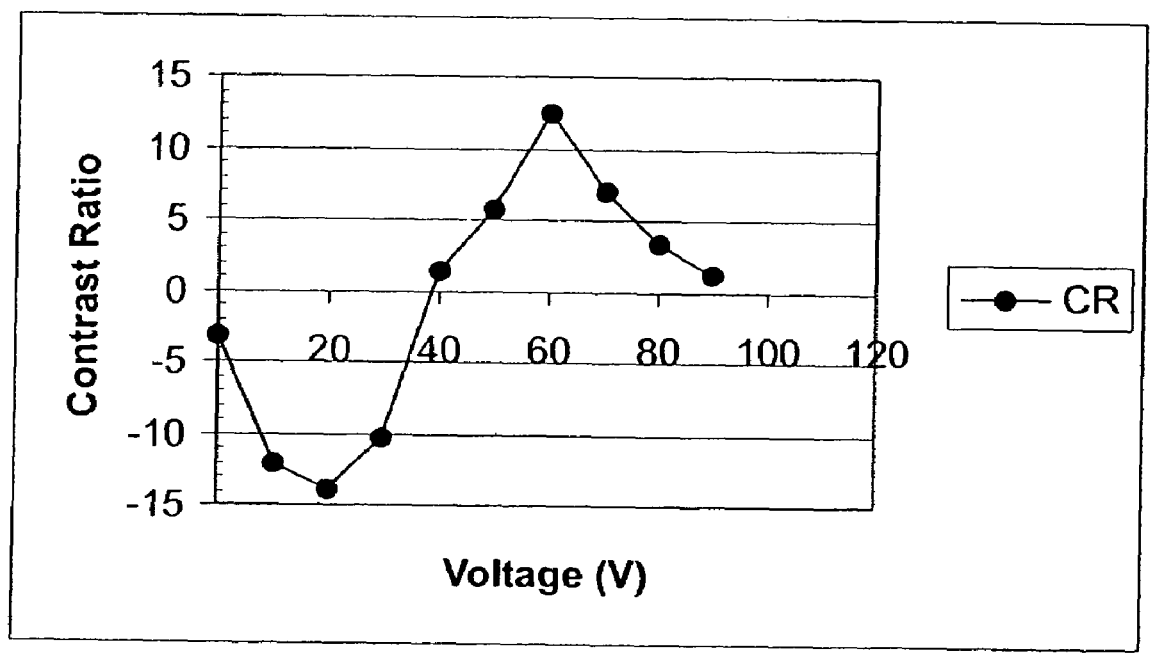
FIG. 5 is a plot of the contrast ratio of the data of FIG. 4.

FIG. 5 shows a plot of the contrast ratio of the data of FIG. 4. The combination of the flash and electrical field creates two high contrast states which are improved from a standard 4:1 contrast ratio to a 14:1 contrast ratio. The two optimal states are optically reversed states. One optimum contrast ratio, 14:1, occurs at 20 volts. Material initially in the planar state is unaffected by the low-voltage pulse without the presence of the flash energy; the presence of energy from flash 52 writes the material into the focal-conic state. A second high-contrast state, 13:1 contrast ratio occurs at 60 volts applied field. Without the flash energy, initially planar material is written into the focal-conic state; the presence of the flash energy writes the material into the planar state.

Figure 6:
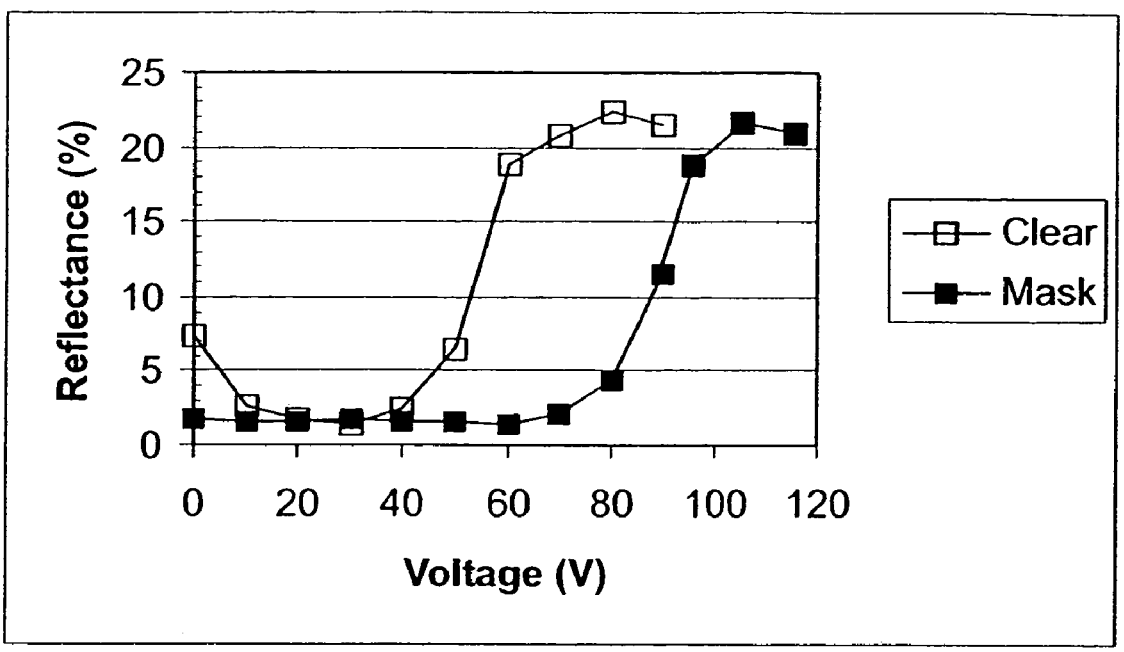
FIG. 6 is a plot of the response of the display of FIG. 1, originally in the focal-conic state, at constant flash lamp energy and various voltages.
Figure 7:
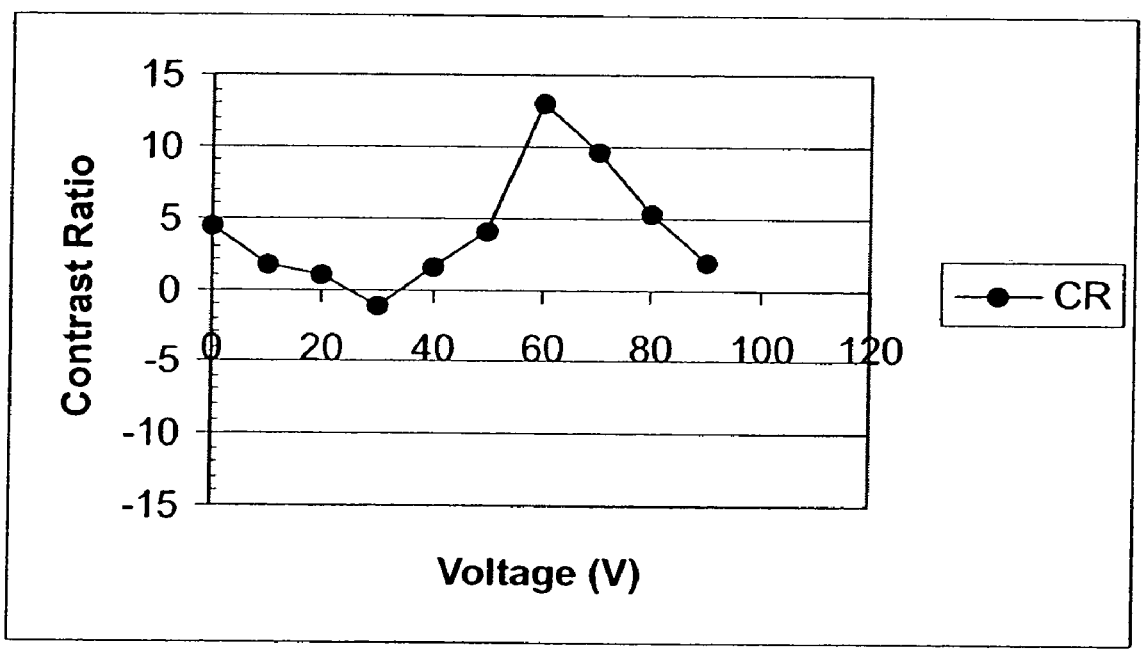
FIG. 7 is a plot of the contrast ratio of the data of FIG. 6.

FIG. 6 is a plot of the response of the display of FIG. 1, originally in the focal-conic state, at constant flash lamp energy and various voltages. FIG. 7 is a plot of the contrast ratio of the data of FIG. 6. Application of a low field again reduces the reflection of focal-conic material from 7 percent to 2 percent. Only one pair of bistable states is possible in this system, again at 60 volts, which has a contrast ratio of about 13. Material initially in the focal-conic state remains in the focal-conic state at a medium level voltage. Energy from flash 52 causes initially focal-conic material to be driven into the planar state. Apparently, heat from flash 52 reduces the voltage required to drive cholesteric material into the planar state.

It was observed that at 60 volts of applied field, the final state of the material was defined by mask 54 if the material was initially in either the planar or focal-conic state. The phenomenon eliminates the need to initially write the material into an initial state before flash-writing an image. The single writing process, without an initialization step, provides a fast, parallel method of writing display 10.

The multiple states of the system suggest a variety of drive schemes, shown in Table 1. A first scheme (1) initializes display 10 into the planar state using either a 100 volt pulse (1A) or a 60 volt pulse with flash (1B). A low, 20 volt, pulse in conjunction with the flash permits selective writing using mask 54. In a second scheme (2), display 10 is written into the focal conic state either without flash (2A) or with a flash (2B). In scheme 2, 60 volts is applied to display 10, and areas receiving flash light are written into the planar state, and areas that are masked remain in the focal-conic state. In a third scheme (3) is essentially identical to scheme 2B, but eliminates initialization to a focal-conic state. A 60 volt pulse in the presence of flash energy provides image-wise writing of display 10 using mask 54 without initialization. The use of an initialization step may be useful in applications that require display 10 to be erased in a first operation, and a later re-writing of display 10.

TABLE 1

| SCHEME | Initial Flash | Initial voltage | Initial state | Write Voltage | Masked | Clear |
|---|---|---|---|---|---|---|
| 1A | No | 100 | Planar | 20 | Planar | F-C |
| 1B | Yes | 60 | Planar | 20 | Planar | F-C |
| 2A | No | 60 | F-C | 60 | F-C | Planar |
| 2B | Yes | 20 | F-C | 60 | F-C | Planar |
| 3 | — | — | XXXX | 60 | F-C | Planar |

Figure 8:
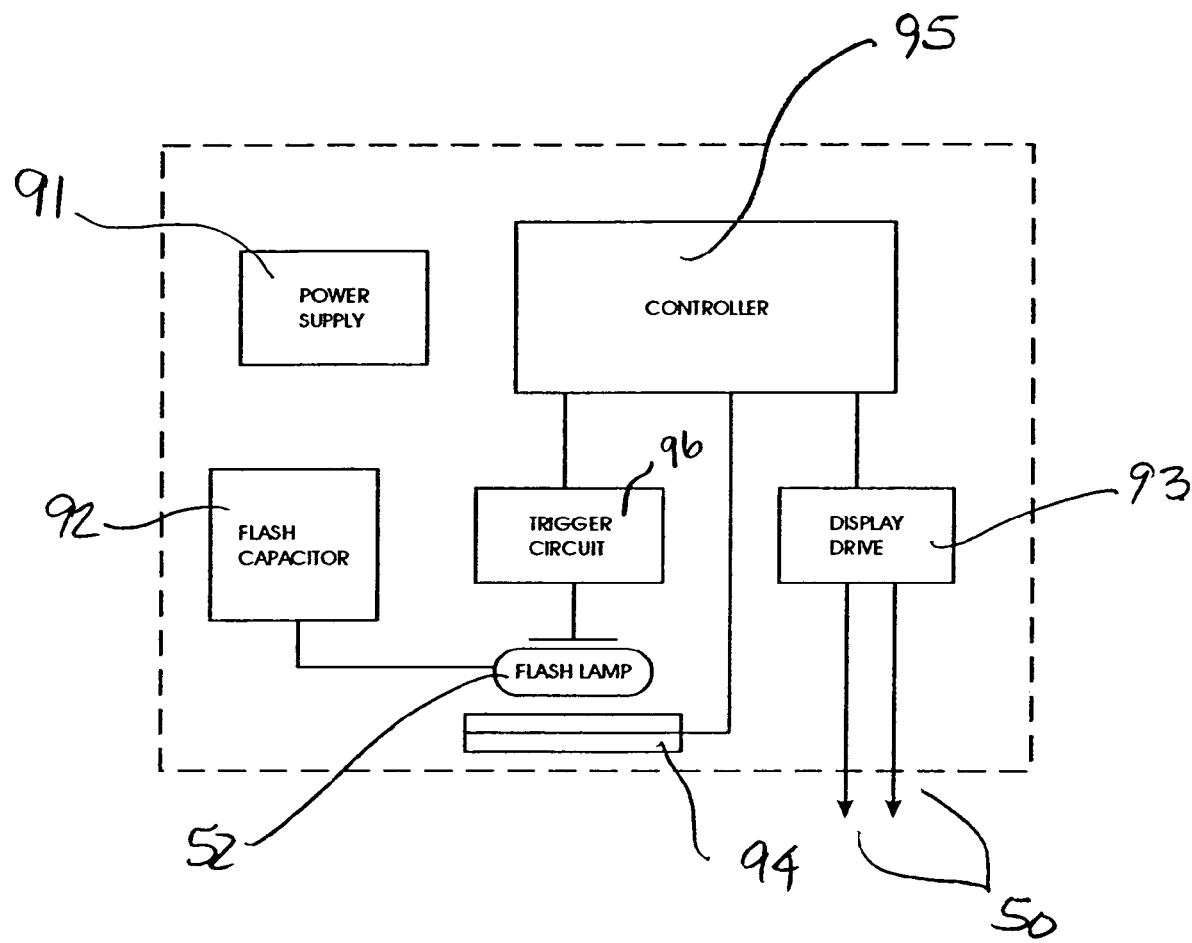
FIG. 8 is an electrical schematic diagram for a display writer in accordance with the present invention.

FIG. 8 is an electrical schematic for a display writer made in accordance with the present invention. A power supply 91 provides power to a flash capacitor 92 and to the display drive 93. A masking display 94 is disposed to selectively mask the output of flash 52. Masking display 94 can be a simple twisted-nematic (TN) or super-twisted-nematic (STN) display of conventional design. Controller 95 supplies information to masking display 94. Controller 95 applies writing voltage to electrodes 50 through display drive 93, connected to display 10. A trigger circuit 96 triggers flash 52 in conjunction with the application of a bipolar electrical field from display drive 93. The flash energy is masked by masking display 94 to apply an image-wise light pattern from flash lamp 52 in conjunction with an applied field to write an image on display 10.

In an experiment, a dot-matrix super-twisted-nematic (STN) display, part number TM 13164 BCHG-1 from Tianma Corporation in Taiwan was placed over a display 10 which was built in accordance to the preferred embodiment. A Vivitar flash, already described, was adjusted so that light absorbing portions of the STN display masked the flash and transparent portions of the STN display passed flash light. The masking effect was sufficient to write areas of display 10 into the focal-conic or planar states depending on the optical state of the masking display 94. The flash unit was discharged through the STN display repeatedly with no observable harm to the structure of the STN display or display 10. The experiment shows that it is possible to use simple, low-cost STN displays as masking display 94.

Figure 9:
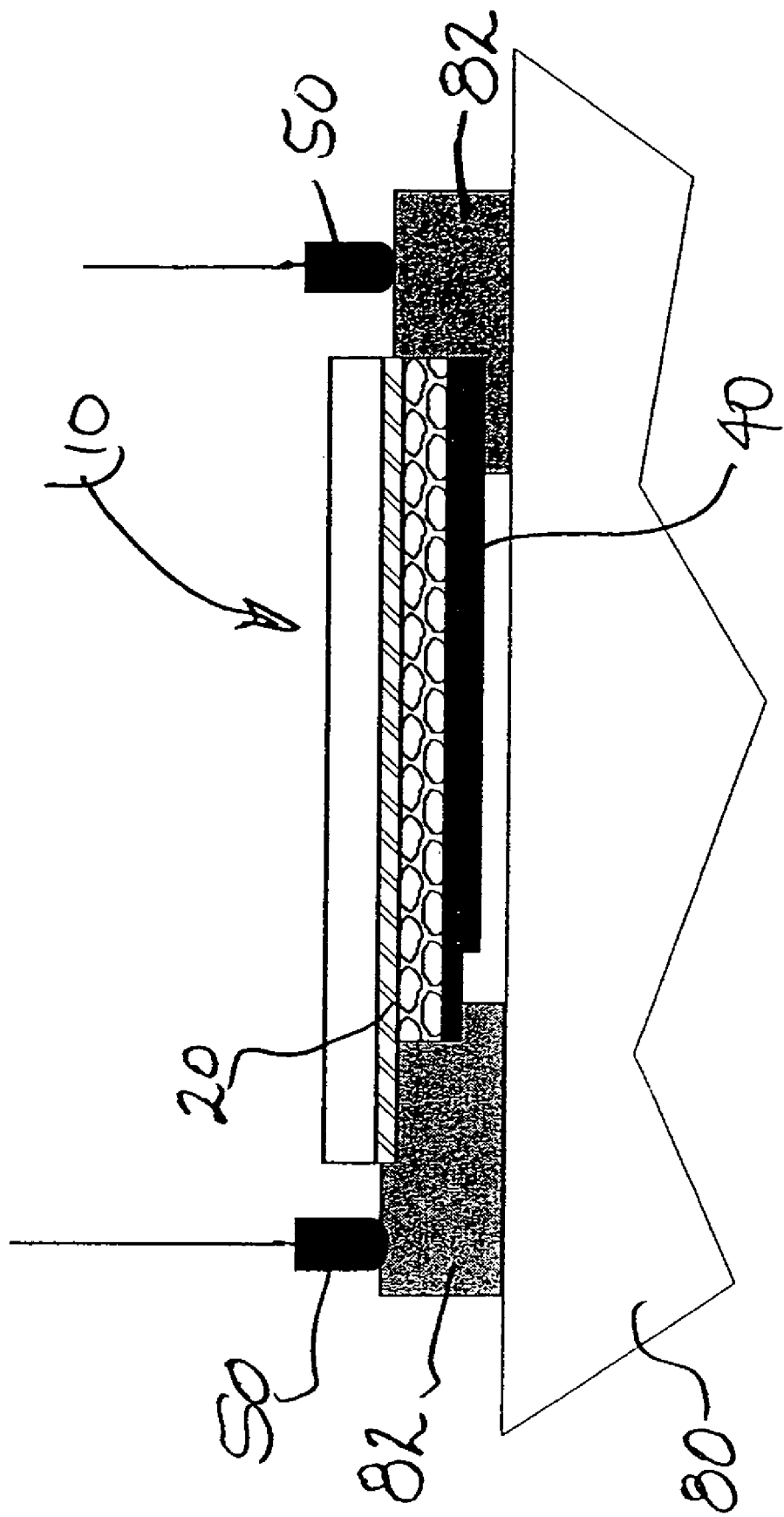
FIG. 9 is a side view of the display of FIG. 1 attached to an object.

FIG. 9 is a side view of the display of FIG. 1 attached to an object 80. Object 80 can be a tray that supports display 10 or an article to which display 10 is attached, such as a card. Display 10 is attached to object 80 using contacts 82. Contacts 82 can be an electrically conductive adhesive having two areas, a first area in contact with first transparent conductor 20 and a second area in contact with second conductor 40. In FIG. 9, the left portion is connected to first transparent conductor 20 and the right portion is connected to second conductor 40. Contacts 82 are connection areas for electrodes 50 to connect to display 10 as well as an adhesive to secure display 10 to object 80.

Figure 10:
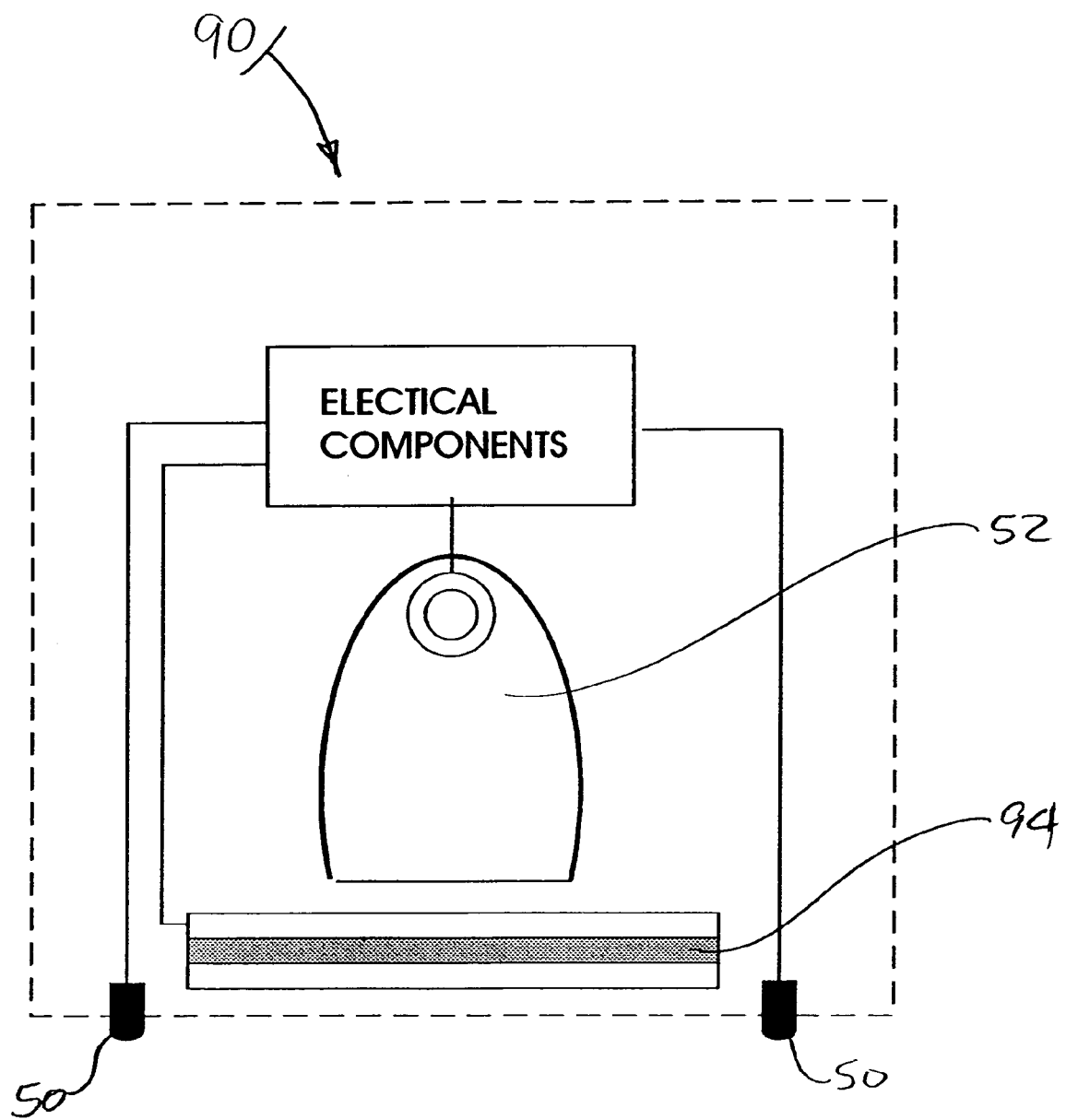
FIG. 10 is a side schematic view of a display writer in accordance with the present invention.

FIG. 10 is a side schematic view of a separable writer in accordance with the present invention. In the preferred embodiment, writer 90 is connected to display 10 for a writing event. Writer 90 contains the electrical components of FIG. 8. Writer 90 has a housing (not shown) which positions flash 52, masking display 94 and electrodes 50 in positions to write a display 10. Details (not shown) of conventional design in object 80 and the housing of writer 90 align writer 90 to display 10.

Figure 11:
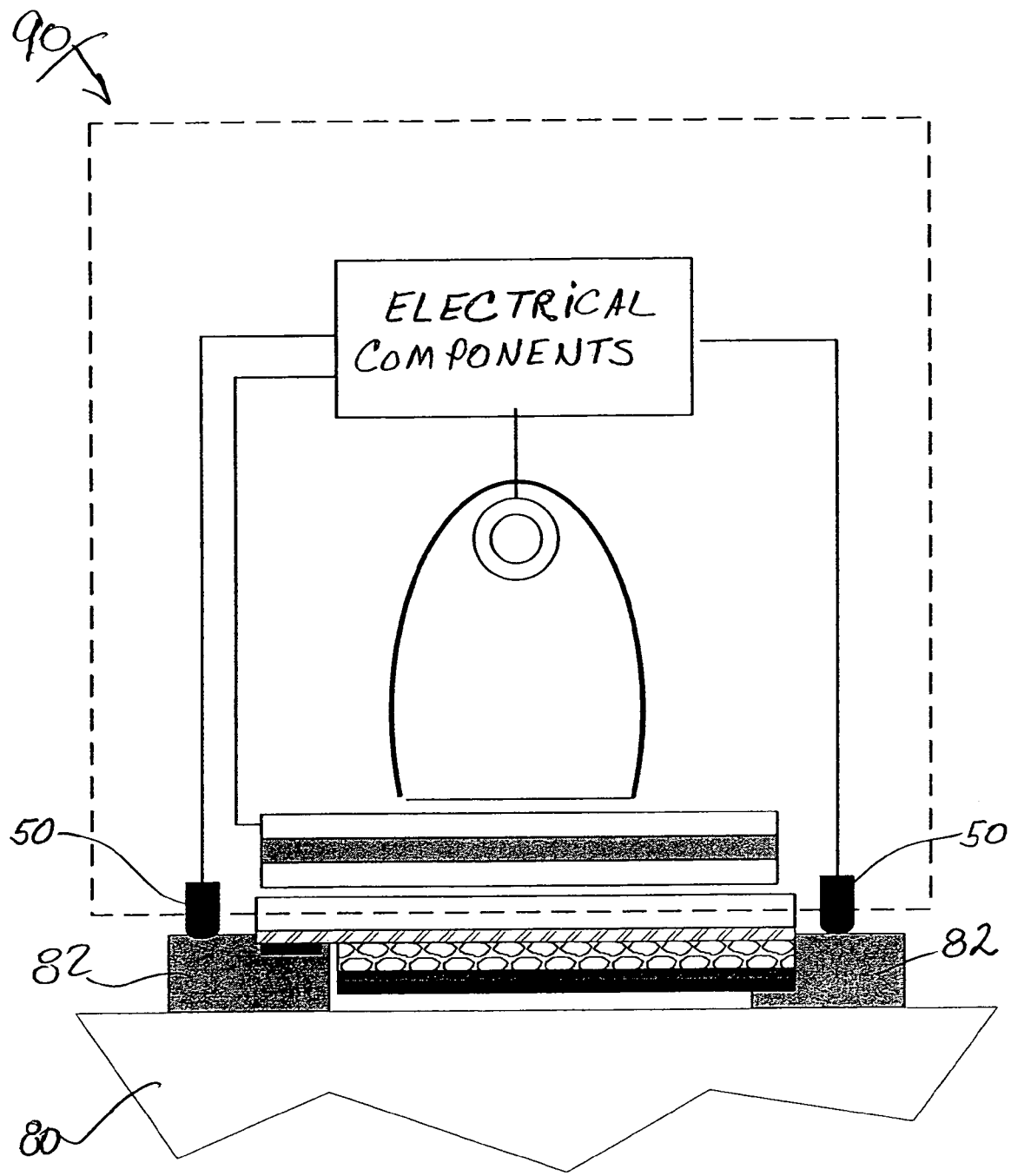
FIG. 11 is a side view of the display writer connected to a display to write the display in accordance with the present invention.

FIG. 11 is a side section view of the writer connected to the display to write display 10 in accordance with the present invention. Writer 90 is connected to display 10 when electrodes 50 are pressed against contacts 82. Sensors (not shown) of conventional design can be connected to controller 95 to signal that writer 90 is connected to display 10. Sensors can also be provided to signal controller 95 to write an image to display 10. The writing method, previously disclosed, can be used to write an image on display 10. Writer 90 can be detached from display 10, and used to write other displays 10. Object 80 has attached information on display 10 that has been updated.

Figure 12A:
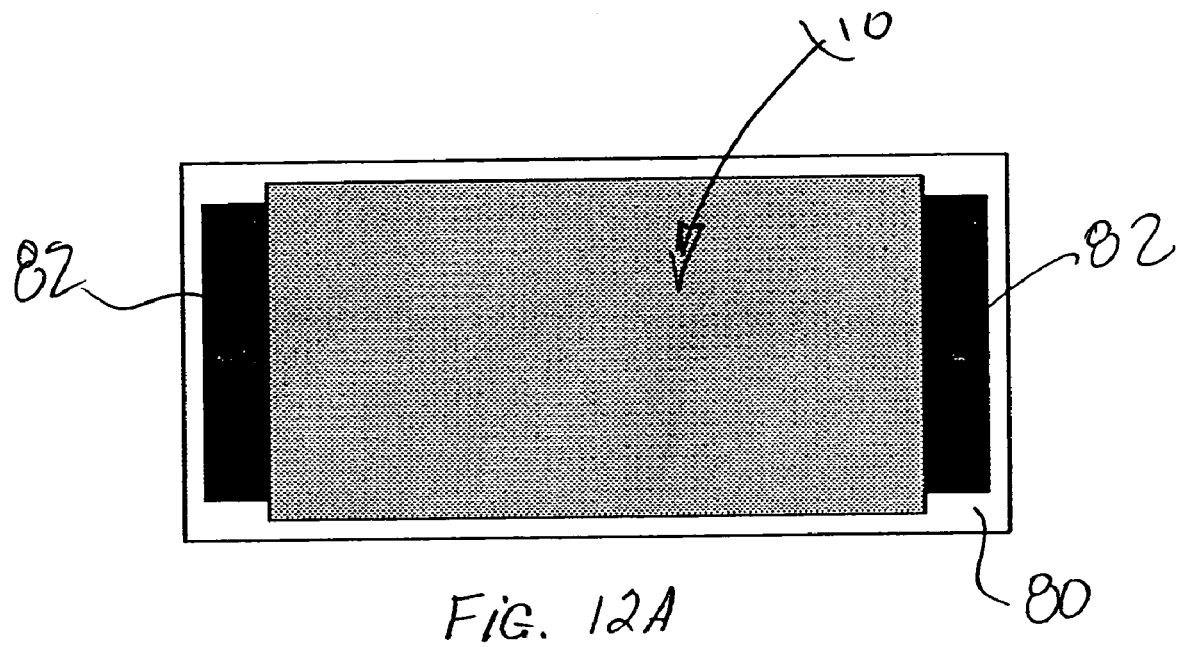
FIGS. 12A and B are front views of a display according to the present invention in prewritten state and written states, respectively.
Figure 12B:

FIG. 12A shows a display 10 according to the present invention in a prewritten state. When display 10 is manufactured according to the present invention, the material is uniformly in the planar state. Alternatively, display 10 may have been written and can have areas having cholesteric material in either a focal-conic or planar state, or any intermediate state. Alternatively, previous information may have been erased by writer 90 in a previous writing event. Returning to FIG. 11, writer 90 is brought into a writable position with respect to display 10. In that position, electrodes 50 contact areas of contacts 82 which are connected to first transparent conductor 20 and second conductor 40. Using method 3, no initialization writing is performed. A masking display 94 in writer 90 receives image data from controller 92. Controller 92 applies a field through electrodes 50 to display 10 and discharges flash 52. Radiation from flash 52 selectively heats areas of display 10 in the presence of an electric field to write an image on display 10. Areas of display 10 receiving light are written into the planar state and areas masked from light from flash 52 are written into the focal conic state regardless of initial state of the cholesteric liquid crystal. FIG. 12B is a display according to the present invention in a written state. Brighter, lighter areas have been written into the planar state and the darker areas have been written into the focal-conic state.

The method and apparatus of this invention provides low-cost, simple and rapidly written labels with high information content. The displays are inexpensive, having a few simple, un-patterned, mass produced layers. The writing apparatus itself is simple, requiring a low-cost flash system, an inexpensive masking display and a 2 wire electrical exciter for the display 10. Separating the drive from the display permits many inexpensive labels to be written by a single, simple display writer 90.

The invention has been described in detail with particular reference to certain preferred embodiments thereof, but it will be understood that variations and modifications can be effected within the spirit and scope of the invention.

PARTS LIST 10 display
15 display substrate
20 first transparent conductor
20' exposed first conductor
22 first conductor cover
30 light modulating layer
35 light absorber
40 second conductor
50 electrodes
52 flash
54 mask
60 incident light
62 reflected light
72 planar liquid crystal
74 focal-conic liquid crystal
80 object
82 contacts
90 writer
91 power supply
92 flash capacitor
93 display drive
94 masking display
95 controller
96 trigger circuit

What is claimed is:
1. A method of writing and erasing an image, comprising
   (a) providing a layer of polymer dispersed cholesteric liquid crystal material disposed between a pair of unpatterned conductors and a light absorber for forming an image wise thermal pattern in response to an image wise pattern of light;
   (b) applying an electrical field having a first magnitude across the unpatterned conductors to erase any image in the polymer dispersed cholesteric liquid crystal material and initializing the material; and

(c) applying an electrical field having a second magnitude across the unpatterned conductors and exposing the layer of polymer dispersed cholesteric liquid crystal material to an image wise flash of light to write the image.

2. The method of claim 1, wherein a combination of the applying the electric field having the second magnitude and the exposing via the image wise flash of light provides a contrast ratio with respect to a state change caused by the combination in the polymer dispersed cholesteric liquid crystal material that is greater than the contrast ratio otherwise provided by a light source without a flash.

3. The method of claim 1, wherein the exposing via the image wise flash to write the image comprises causing a state change in the polymer dispersed cholesteric liquid crystal material via the image wise flash.

4. A method of writing and erasing an image on a display, comprising:
   (a) providing a display comprising a pair of conductors, at least one conductor being transparent, for forming an electrical field there between; a layer of polymer dispersed cholesteric liquid crystal material disposed between the conductors, the polymer dispersed cholesteric liquid crystal material having multiple stable optical states at zero electrical field and responsive to an electric field between the conductors for changing optical state; and a light absorber for forming an image wise thermal pattern in the polymer dispersed cholesteric liquid crystal sufficient to change the optical state of the polymer dispersed cholesteric liquid crystal to display the image; and
   (b) applying a first electrical field across the conductors and exposing the layer of polymer dispersed cholesteric liquid crystal material to an image wise flash of light to write the image.

5. The method of claim 4, further comprising applying a second electrical field across the conductors to erase any image in the polymer dispersed cholesteric liquid crystal material and initialize the material before applying the first electrical field.

6. The method of claim 5, wherein a flash of light is applied with the second electrical field.

7. The method of claim 5, wherein the second electrical field has the same or greater magnitude than the first electrical field.

8. The method of claim 4, wherein a combination of the applying the first electrical field and the exposing via the image wise flash of light provides a contrast ratio with respect to a state change caused by the combination in the polymer dispersed cholesteric liquid crystal material that is greater than the contrast ratio otherwise provided by a light source without a flash.

9. The method of claim 4, wherein the exposing via the image wise flash to write the image comprises causing a state change in the polymer dispersed cholesteric liquid crystal material via the image wise flash.

* * * * *